(12) United States Patent  
Jackson et al.

(10) Patent No.: US 8,971,855 B2
(45) Date of Patent: Mar. 3, 2015

(54) OFF NET PROVISIONING

(71) Applicants: Cellco Partnership, Basking Ridge, NJ (US); Verizon Patent and Licensing Inc., Basking Ridge, NJ (US)

(72) Inventors: Phillip Bernard Jackson, Easton, PA (US); John Antypas, III, Pittsburg, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/718,807

(22) Filed: Dec. 18, 2012

(65) Prior Publication Data

US 2014/0171026 A1 Jun. 19, 2014

(51) Int. Cl.
*H04W 12/06* (2009.01)
*H04W 8/26* (2009.01)

(52) U.S. Cl.
CPC .............. *H04W 12/06* (2013.01); *H04W 8/265* (2013.01)
USPC .......................................... 455/411; 370/331

(58) Field of Classification Search
USPC ..................... 455/411, 432.1, 435.1; 370/331
See application file for complete search history.

(56) References Cited

U.S. PATENT DOCUMENTS

| | | | |
|---|---|---|---|
| 6,879,585 B2 | 4/2005 | Sandhu | |
| 2005/0085225 A1* | 4/2005 | Benco et al. | 455/424 |
| 2009/0253409 A1* | 10/2009 | Slavov et al. | 455/411 |
| 2010/0260146 A1* | 10/2010 | Lu | 370/331 |
| 2010/0267383 A1 | 10/2010 | Konstantinou et al. | |
| 2012/0240195 A1* | 9/2012 | Weiss | 726/4 |
| 2012/0272056 A1* | 10/2012 | Ganesan | 713/156 |

* cited by examiner

Primary Examiner — Myron K Wyche

(57) ABSTRACT

An activation of a wireless device for network service on a home network of the carrier or service provider with which a user subscribes or intends to subscribe can be implemented over an alternate wireless network, e.g., a network of another wireless carrier. A data communication containing a request for activation is received from a non-activated wireless device via the alternate wireless network on a server configured to provide activation. The data communication is compared to one or more activation criteria. Upon determining, based on the comparison, that the content meets the one or more activation criteria, an activation data packet for activation of the non-activated wireless device is sent to the non-activated wireless device over the home wireless network and over the alternate wireless network.

20 Claims, 4 Drawing Sheets

| Source Carrier ID | Destination Realm | Service Tag | Destination URL |
|---|---|---|---|
| 409 (Bob's Cellular) | vzw3g.com | ##**VZW0001 | http://serviceat.vzw.com |
| 409 (Bob's Cellular) | vzw3g.com | ##**VZW0002 | http://service2.vzw.com |
| 511 (Bert's Carrier) | bert.com | ##*BERT0003 | http://endpoint.bertme.com |
| 555 (Ernie's Telco) | ernie.net | ##***ERNIE1 | http://hoopers.ernie.net |

OFF NET PROVISIONING

BACKGROUND

In recent years, mobile wireless communications have become increasingly popular. Initial implementations of mobile wireless communications, for example in the form of cellular telephone networks, supported circuit switched voice communication services. Wireless communication devices such as mobile or "cell" phones have expanded greatly in functionality over the last decade. As the public wireless communication networks have evolved to provide greater bandwidth and packet based services, the industry has developed a variety of data services, such as web browsing, as well as a variety of mobile messaging service technologies, such as multimedia message service (MMS) technology. Along with the advances in network technologies has come a technological revolution in the capabilities offered by a vast array of advanced wireless devices.

Carriers take great care to ensure that wireless devices on their network are authenticated and authorized for service. In this regard, customers are typically required to go through various cumbersome activation processes in order to connect a new wireless device to a wireless network. Until a subscriber activates the wireless device, access to the network is generally not permitted. One typical activation process, in-store activation, requires a customer to enter a store to activate the mobile device. In other instances, activation, authentication, and provisioning are performed "over the air" where the subscriber initiates the activation process by pressing an activation button or dialing a prescribed sequence on the wireless device.

Over-the-air service activation requires communication with a server or the like of the carrier with whom the user subscribes or intends to subscribe for mobile network communication services for the particular device. This communication is a relatively simple and convenient matter, when the wireless device to be activated is in an area where the device can communicate via the particular carrier's network. However, in some cases, the wireless device may be in an area where a designated wireless carrier's network is not available. Further, other networks of alternate carriers may not recognize the device and therefore prohibit network access for activation communication with the server of the intended service provider/carrier. There currently is not an efficient and secure way of activating a wireless device over an alternate network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 illustrates an exemplary database in the form of a look-up table that correlates wireless devices with their respective wireless networks.

DETAILED DESCRIPTION

Figure 1:
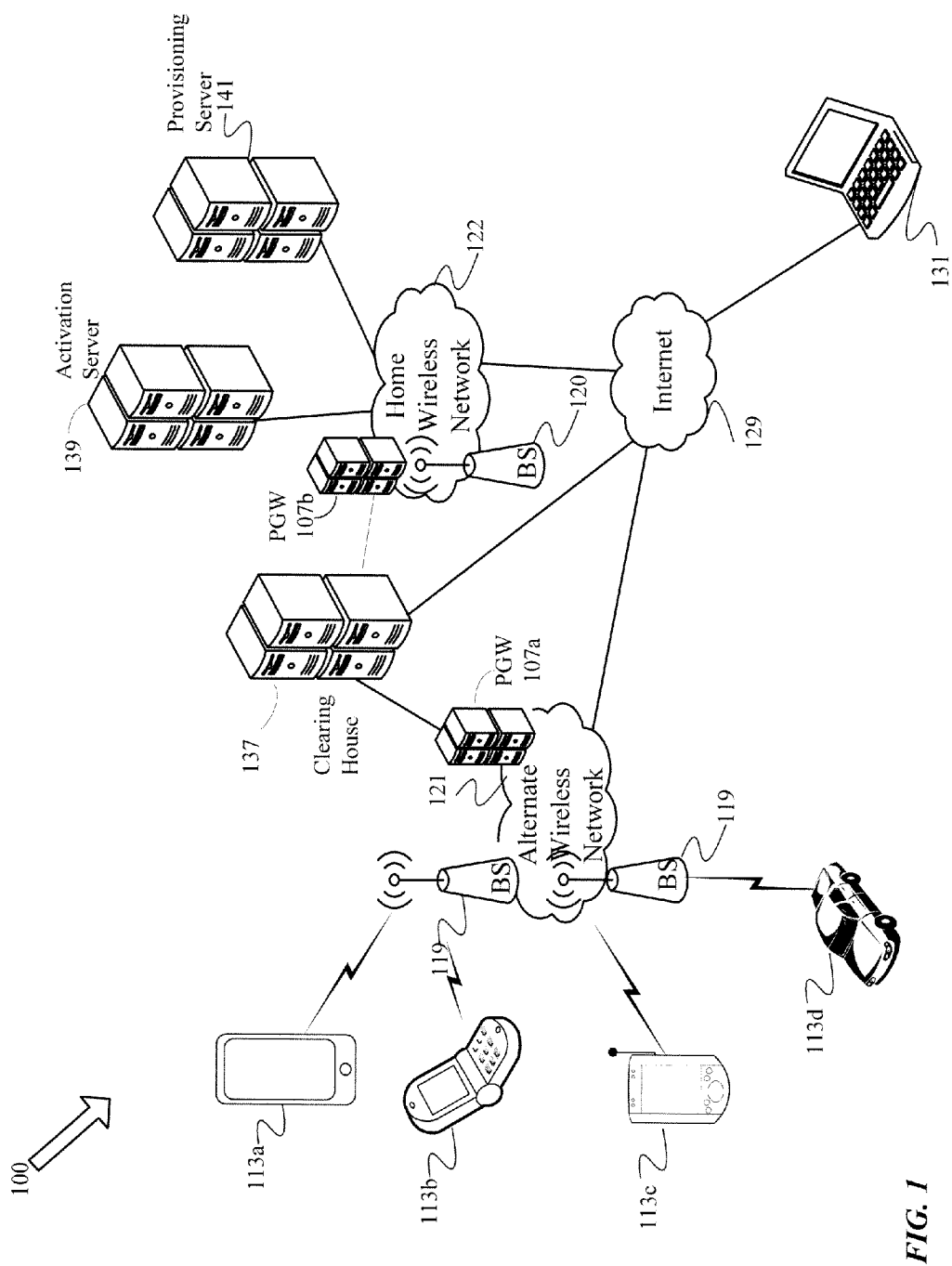
FIG. 1 illustrates a wireless packet data communications network for providing a mobile communications for wireless devices as well as a system providing a framework for activation of a wireless device using an alternate network.

While certain embodiments and aspects of the technology are depicted in the drawings, it will be understood that the embodiments and aspects depicted are illustrative and that variations of those shown, as well as other embodiments and aspects described herein, may be envisioned and practiced within the scope of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable a user of a wireless device to activate the device for operation on a home network of a carrier or service provider with which a user subscribes or intends to subscribe. The activation is performed over an alternate wireless network (e.g., a network of another wireless carrier). Systems and methods in accordance with the present disclosure provide creation of a secure connection with a home network via an alternate network for a limited purpose, such as wireless device activation. When a data communication including a request for activation of a non-activated wireless device on a home wireless packed communication network is received by the alternate network, the call is routed via a secure channel (e.g., IP tunnel) to a proxy server (e.g., clearing house) that in turn routes the activation request to an activation server of the home network. The wireless device is validated and requisite information is sent back to the wireless device for self activation. Once the wireless device is activated, it can place normal calls using the home network or perform normal roaming in alternate networks.

In one example, the wireless device user initiates activation of the wireless device by dialing a predetermined sequence or code. For example, a user purchases a non-activated wireless device (and/or one with a non-activated SIM card). The wireless device may be taken to another country or outside the range of a home wireless network that is associated with the wireless device. When turned ON, the wireless device may provide a customized interface (e.g., a sequence of user interface screens) to walk the customer/user through the activation process even though the wireless device is not yet activated. In one example, the activation interface includes a sequence of user input screens associated with activation of the wireless device. The wireless device communicates over an alternate wireless network that provides a secure IP tunnel between the wireless device and the home wireless network for the limited purpose of device activation. As a result, the wireless device can then be activated by using an alternate wireless network.

In one example, an activation method is initiated via an alternate (e.g., foreign or another service provider) wireless network by using a clearing house to act as a bridge between the alternate wireless network and the home wireless network. The alternate wireless network does not reject the non-activated wireless device that belongs to the other (i.e., home) wireless network because the predetermined code received therefrom is identified as an activation request. For example, the alternate network may not know that an activation request is in progress. The unique sequence or code dialed by the wireless device merely notifies the alternate network to open a secure channel to the clearing house. The alternate network simply forwards the information from the wireless device to a predetermined destination. In this example, the alternate wireless network understands, based on the received code, to route the date to the clearing house. For example, the ultimate destination is the home wireless network of the wireless device to provide.

Perhaps it would be helpful to provide an exemplary list of elements involved in the activation process. In one example:

(a) The wireless device is not yet activated and is aware that by sending the predetermined code, the wireless device is requesting activation with the home wireless network.

(b) The alternate wireless network, upon receiving the predetermined code, is aware that the wireless device has requested a unique service based on the predetermined code. It is also aware that the data packet from the wireless device is to be routed to the clearing house over a secure channel. For example, the alternate wireless network is aware how to proceed (e.g., where to route the data packet from the wireless device to) because of a prior agreement between the alternate wireless network and the home wireless network. However, the alternate wireless network may not be aware that the purpose of the data packet from the wireless device is for activation of the wireless device.

(c) The clearing house knows it has received a data packet from the alternate wireless network. Further, the clearing house knows to route the data packet to one its defined endpoint. For example, by prior agreement with the home wireless network carrier, the clearing house routes the data packet from the wireless device to the home wireless network (e.g., in this case for activation).

For example, the wireless device now has a secure channel to a defined service endpoint (i.e., the home wireless network) for activation. The activation of a unique code causes the alternate network to open a proxy through the clearing house, to the home carrier's defined service endpoint. The alternate network and clearing house, may not know what this endpoint does—they only know they need to proxy the data packet to it.

Reference now is made in detail to the examples illustrated in the accompanying drawings and discussed below. FIG. 1 illustrates a system 100 having a home wireless network 122 and an alternate wireless network 121. A home carrier's wireless network 122 is one that the wireless device is configured to work with for regular voice and data communication. Put differently, a home carrier's wireless network 122 is the network of a service provider with whom the user has or intends to have a subscription for the wireless device. On the other hand, the alternate wireless network 121 is one that the wireless device is not intended to work with for regular voice and data communication. For example, the alternate wireless network 121 may be a foreign network or the network of a competing service provider with whom the user does not intend to have a subscription for the wireless device. Nevertheless, the alternate wireless network 121 acts as a bridge between the wireless device 113a and the home wireless network 122. By way of example, consider a handset manufacturer associated with the alternate wireless network 121 who wishes to build and test handsets before shipping them to the home network. In one aspect, the alternate wireless network acts as a bridge between the wireless device (e.g., 113a) and the home wireless network 122 for a limited purpose, such as activation of the wireless device 113a.

The system 100 includes or serves a number of wireless devices and is coupled to other communication networks, such as the Internet 129. The drawing also depicts several systems/elements associated with or included in the wireless networks 121 and 122 for various functions as may be involved in providing activation for one or more wireless devices 113a to 113d.

System 100 may be operated by several carriers or service providers to provide a wide range of mobile communication services and ancillary services or features to its subscriber customers and associated wireless device users. The elements indicated by the reference numeral 100 generally are elements of several networks (e.g., 121 and 122). They are operated by or on behalf of several carriers (i.e., 121 and 122 in this example), although the wireless devices typically are sold to the respective carrier's customers. The mobile communication system 100 provides communications between wireless devices as well as communications for the wireless devices with networks and stations outside the mobile communication system 100.

For purposes of later discussion, several wireless devices (e.g., 113a to 113d) appear in the drawing, to represent examples of the wireless devices that may receive various services via the wireless communication system 100 upon activation. Today, wireless devices typically take the form portable handsets, smart-phones, tablet computers or personal digital assistants (PDAs), although they may be implemented in other form factors, including being embedded in vehicles and/or other consumer and business electronic devices. The wireless devices 113a, 113b, 113c, and 113d, for example, may take the form of a mobile telephone station, enhanced with display and user input capabilities to support certain text and image communications, such as email, picture communication and web browsing applications. In another example (e.g., as illustrated by 113d), the wireless device may be embedded in another product, such as a vehicle.

In one example, the system 100 allows users of the wireless devices to initiate and receive telephone calls to each other as well as through the public switched telephone network (PSTN) and telephone stations (not shown). The system 100 can also offer a variety of other data services via the Internet 129, such as downloads, web browsing, e-mail, etc. The mobile communication system 100 typically is implemented by a number of interconnected networks. Hence, the overall system 100 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the system 100, such as that serving wireless devices 113a to 113d will typically include one or more RANs and a regional circuit and/or packet switched network and associated signaling network facilities.

Physical elements of a RAN, operated by one of the mobile service providers or carriers, include a number of base stations represented in the example by the base stations (BSs) 119 for the alternate wireless network 121, and 120 for the home wireless network 122. Such base stations 119 and 120 typically comprise a base transceiver system (BTS) which communicates via an antennae system at the site of base station and over the airlink with one or more of the wireless devices 113a to 113d when the wireless devices are within range. Each base station 119 and 120 typically includes a BTS coupled to several antennae mounted on a radio tower within a coverage area often referred to as a "cell." The BTS is the part of the radio network that sends and receives RF signals to/from the wireless devices that the base station currently serves.

Each radio access network also includes a traffic network, represented generally by clouds 121 and 122, which carries the user communications for the wireless devices 113a to 113d between the respective base stations 119/120 and other elements with or through which the wireless devices 113a to 113d communicate. Individual elements such as switches and/or routers forming the traffic networks 121 and 122 are omitted here for simplicity. In one example, the alternate wireless network 121 is a local wifi network.

The carrier also operates and/or is in communication with a number of systems that provide ancillary functions in support of the communication and activation services provided through the system 100. The support elements include, for example, a clearing house 137, an activation server 139, and a provisioning server 141, which are each discussed in more detail below.

The clearing house 137 is an intermediary between the alternate wireless network 121 and the home wireless network that acts as a proxy for authentication. It is configured to receive credentials of the (e.g., not yet activated) wireless device. For example, the clearing house 137 can receive one or more of a Machine Identification Number (MID), Mobile Equipment Identification Number (MEID), International Mobile Equipment Identity (IMEI), etc., of the wireless device via the alternate wireless network 121. The different identification numbers are collectively referred herein as "MID" for simplicity.

The clearing house 137 provides authentication of the non-activated wireless device request and determines which (e.g., wireless) network to route the call (i.e., data packet) to. In one example, the clearing house 137 has a database that it uses to correlate the MID of the wireless device, with the appropriate provider. In one aspect, the clearing house 137 allows disparate technologies and standards to interoperate such that different carriers (e.g., represented by networks 121 and 122 herein) can provide their subscribers sufficient access to activate and/or update a wireless device (e.g., 113a). For example, for Global System for Mobile Communications (GSM) wireless communication, General Packet Radio Service (GPRS) roaming exchange (GRX) may act as the clearing house 137 for GPRS connections from roaming users for wireless devices 113a to 113d, removing the need for a dedicated link between each GPRS service provider. In another example, for Code Division Multiple Access (CDMA), a CDMA Packed Data Roaming Exchange (CRX) is used as the clearing house 137. In one example, Syniverse is used as the clearing house 137.

For example, the clearing house 137 accepts connections from alternate wireless network such as alternate wireless network 121, noting their carrier IDs (e.g., a CDMA network carrier would have a System ID (SID) and Network ID (NID), and the MID of the wireless device 113a using them). Thus, the clearing house 137 receives an MID from the wireless device 113a. For CDMA, the SID and NID of the alternate network (though LTE or GSM would use other network identifiers.) Along with the code received from the alternate wireless network, the clearing house 137 now has the following datum items on input (e.g., code, MID, SID, NID). The datum items can be used as a lookup in the clearing house's database to find the desired service endpoint. For example, the clearing house might have a database table such as the one below:

| SID | NID | Code | Service URL |
|-----|-----|------|-------------|
| 401 | 40 | #**VZW0000 | https://vzwactivate.vzwnet.com |
| 408 | 52 | #**BILL0000 | https://billing.mynextel.com |

The clearing house 137 uses the sent objects in the data packet (in this example, CDMA), SID, NID and code to look up the desired destination URL. This URL is where the clearing house 137 will proxy traffic to.

Assuming the code and URL refer to an activation service, the provisioning server 141 is configured to receive the MID associated with the (e.g., not yet activated) wireless device 113a from the clearing house 137 via its home wireless network 122. The provisioning server 141 performs several functions, including: (1) validate the MID (e.g., determine that the wireless device is not rogue (e.g., unauthorized to subscribe to the home network)); (2) determine that the wireless device 113a is not yet activated; and/or (3) identify that the wireless device 113a is requesting activation from the home wireless network.

The activation server 139 is configured to receive the MID from the provisioning server 141 after the provisioning server 141 has authenticated the validity of the activation request by the wireless device 113a. For example, based on the information received from the provisioning server 141 (e.g., MID and indication that this is a non-activated device that is requesting activation), the activation server 139 creates an account and prepares data including (e.g., using the CDMA network) a requisite mobile directory number (MDN), mobile identification number (MIN), and/or other data to be sent to the wireless device 113a to facilitate its activation. For example, for CDMA, the activation data packet may include at least one of the MDN, MIN, A-key, and an encrypted block (e.g., encrypted via the home wireless network carrier encryption algorithm, such as the Cellular Authentication and Voice Encryption (CAVE)). For example, the A-key is a unique cryptographic key used in CDMA that is computed from the MDN (e.g., a pre-shared key). Thus, for 3G-EVDO/1X, the data may include the MDN, the MIN, the A-key and the CDMA CAVE algorithm. Other networks (such as GSM or LTE) may use different credentials in the activation packet. In one example, carriers may also include additional proprietary objects in the activation packet. For example, Verizon Wireless includes its own Dynamic MIP key, namely the Dynamic MIP Key Update (DMU), a unique cryptographic object. The home wireless network 122 generates the activation data packet that includes the above discussed credentials and transfers the data packet to the wireless device 113a. For example, for CDMA networks the encrypted block is the output of the CDMA2000 CAVE algorithm, which accepts MDN, MIN, and A-key as its input. In one example, the data packet also includes a unique DMU key. However, any algorithm could be used to the extent the home wireless network 122 and the wireless device 113a are in agreement. The activation server 139 may include subscriber account records or may be linked with a server that provides such information. A large carrier typically has a number of such systems, and the system that stores the account data for a particular subscriber may be referred to as the "system of record" for that subscriber's account. While activation server 139 and provisioning server 141 are illustrated as separate servers, in one embodiment the activation server 139 is part of the provisioning server 141.

The home wireless network 122 and the alternate wireless network 121 of the mobile communication system 100 may connect to a public packet switched data communication network, such as the network commonly referred to as the "Internet" shown at 129. Packet switched communications via the wireless networks 121/122 and the Internet 129 may support a variety of user services through the system 100, such as wireless device communications and multimedia messages, e-mail, web surfing or browsing, programming and media downloading (including audio and video), etc. For example, the wireless devices may be able to receive messages from and send messages to user terminal devices, such as personal computers, either directly (peer-to-peer) or via various servers (not separately shown). The drawing shows one such user terminal device as a personal computer (PC) 131 by way of example.

Of note for purposes of this discussion, many of the network messages used for activation of a wireless device (e.g., 113a), as discussed herein, may be sent to the respective wireless device 113a using both the home wireless network 122 via the alternate wireless network 121. In various examples, one or both of the networks 121/122 may use the Evolved Packet Core (EPC) that uses the concept of Evolved Packet System (EPS) bearer channels to route IP traffic from their respective gateway 107a/b in the corresponding network 121/122 to the wireless device (e.g. 113a to 113d). A bearer channel is an IP packet flow with a defined quality of service (QoS) between the Packet Data Network (PDN) Gateway (PGW) 107a/b and the wireless device (e.g., 113a to 113d). It is within these packets that messages for activation to a wireless device (113a to 113d) are sent. A gateway 107a/b is the general endpoint for the wireless device for all communications, including activation. Put differently, it is the "anchor" for the wireless device to the network (e.g., 121 or 122).

Once a wireless device is activated, general data communication, such as Internet traffic, is directly over the home wireless network 122 or routed between the home wireless network 122 and the alternate network 121, though it is allowed to use the clearing house 137 if desired. In one example, the home carrier may provide services through the clearing house 137 at a reduced rate. If the wireless device 113a via the alternate wireless network 121 uses a unique code for those services, the account of the wireless device 113a may receive reduced roaming charges as traffic need not traverse the roaming network, but can instead go over a "roaming bypass." By way of example, consider of a bill query service that allows an account holder to view their current account balance. Assuming the code for such a service was ##**MYZBILL, the subscriber could retrieve their bill from the carrier of the home wireless network 122, by using this code, thereby causing the wireless device 113a to gain access to the clearing house 137 mediated service. For example, the carrier of the home wireless network 122 agrees to pay the alternate wireless network 121 carrier for the query traffic (e.g., keeping charges hidden from the subscriber). Alternatively, a data channel could be opened between both wireless networks 121/122, which may lead the subscriber to incur data charges. Accordingly, by using the clearing house 137 service, not only does the subscriber avoid unnecessary roaming charges, but the home and alternate wireless networks 121/122 need not spend time mediating out billing events from the subscriber's billing trail.

For specialized functions such as functions initiated via the special sequences on the alternate network such as the activation of a wireless device discussed herein, data is intentionally sent from the alternate wireless network 121, to the clearing house 137, and from the clearing house 137 to the home wireless network 122. This ensures that the clearing house 137 has a chance to inspect data of interest, such as activation frames.

Accordingly, the PGW 107a provides connectivity from the wireless devices 113a to 113d (that may be roaming in the alternate wireless network 121) to an external packet data network such as their home wireless network 122 through the PGW 107b for activation. Thus, the PGW 107a of alternate wireless network 121 is a point of exit and entry of traffic for un-activated wireless devices 113a to 113d even though wireless devices 113a to 113d are meant to be operated through their home wireless network 122. In one example, the PGW server 107a monitors how much data is used by a wireless device (e.g., 113a to 113d) and charges home wireless network 122 accordingly. In another example, the alternate wireless network 121 and the home wireless network have agreements (e.g., reciprocal) that allow data transfer between a non-activated wireless device (113a to 113d) with their native wireless network.

In one example, an activation data packet can be embedded in the protocol configuration option (PCO) in a message from the activation server to a wireless device (e.g., 113a) through a bearer control plane. The PCO is an information element field within the standard (existing type of) message using a standard protocol of the alternate wireless network 121 to the wireless device. Thus, the PCO may be used to provide information in the form of a data packet useful for activation.

In one example, for activation of a wireless device (113a to 113d), additional information may be provided to the wireless device by the activation server 139, such as step by step instructions to a user on how to self-activate their wireless device. The instructions may be tailored for each platform. For example, instructions for a wireless device that is embedded in a vehicle 113d may be different from instructions for self-activation using a handheld device 113b. In response to receiving the instructions sent by the activation server 139 of the home wireless network 122, the wireless device can present designated display screens containing the instructions to the user to provide a self-activation process with the user's input.

Figure 2:
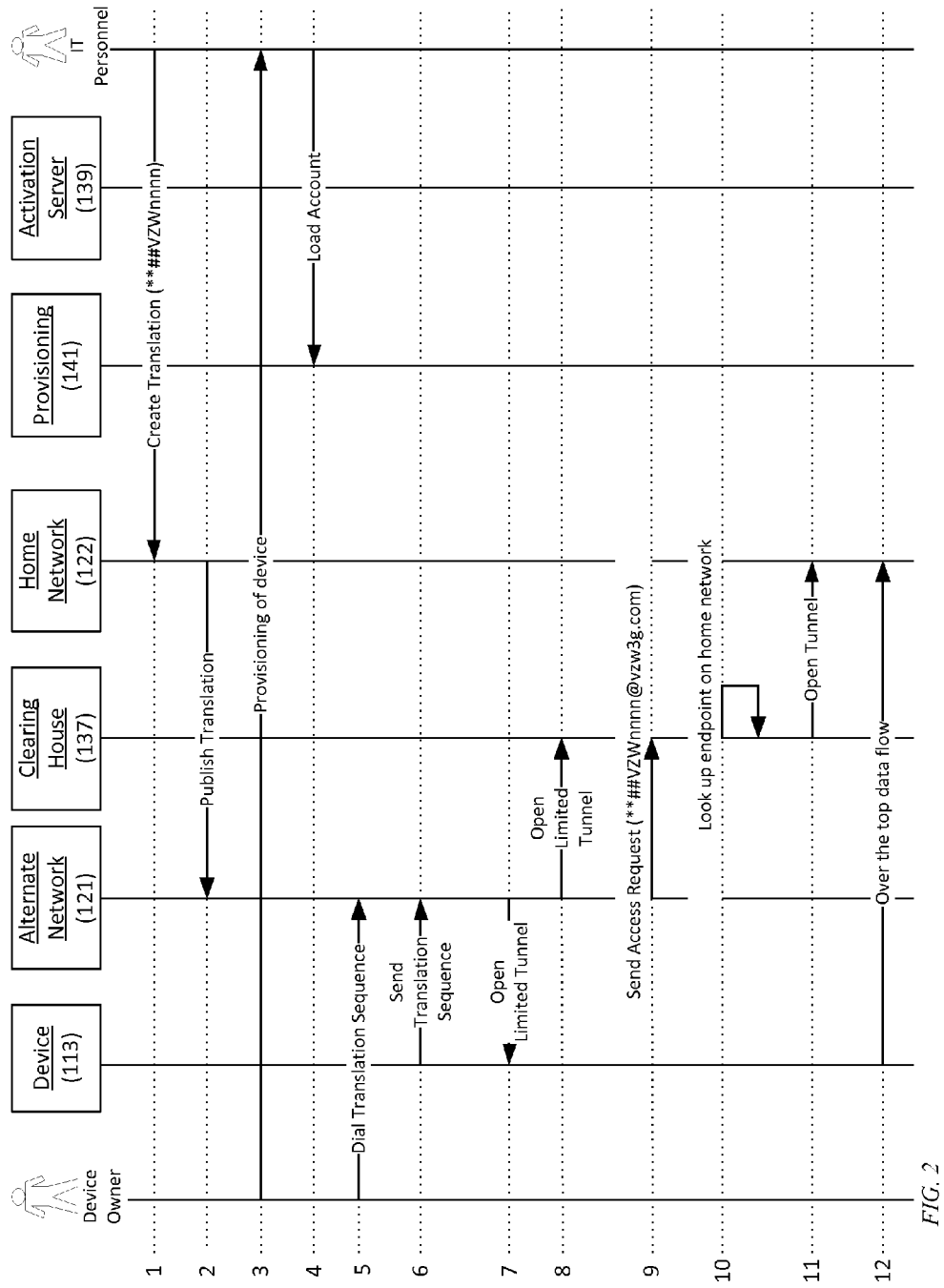
FIG. 2 illustrates an exemplary call flow where a non-activated wireless device requests activation through an alternate wireless network.

With the foregoing overview of the system 100, it may be helpful now to consider a high-level discussion of an exemplary activation of a non-activated wireless device using an alternate wireless network. FIG. 2 illustrates an exemplary call flow where a non-activated wireless device 113 requests activation through an alternate wireless network 121. It is assumed that the firmware of the wireless device 113 is friendly to remote activation. Put differently, the wireless device 113 is aware that activation services exist that will allow the device to be used over a home wireless network 122 upon successful activation.

In step 1, a dialing code that may be used for activation of the wireless device 113 is created by the home network 122 (e.g., by IT Personnel). This dialing code can be used both on the home wireless network 122 as well as the alternate wireless network 121. For example, the service provider of the home wireless network 122 provides a dialing code "##VZWxxxx" where xxxx is a unique four digit number (e.g., ##VZW0000).

In step 2, the provider of the home wireless network 122 publishes the code (e.g., ##VZWO000) to all of its roaming partners, such as the provider of the alternate wireless network 121. This published dialing code indicates to any network (e.g., 121) that receives the code from a wireless device (e.g., 113) to route the call to a clearing house 137 without any further processing. Thus, when any roaming partner (such as alternate wireless network 121) receives an agreed upon dialing code, it knows to create a secure tunnel between the wireless device 113 and the clearing house 137. It should be noted that there is no requirement to have a signal dialing code (e.g., ##VZW0000). For example, codes are used simply to indicate to the alternate wireless network 121 to route the call to the clearing house 137 on a predefined address port. For example, code ##VZW0000 may go to a specific URL of the clearing house 137; on the other hand, ##VZW0001 may map to a different URL for a separate purpose. For example, the alternate wireless network 121 is only aware of the unique codes (e.g., ##VZWxxxx) and the corresponding URLs. The actual meaning and implementation of those codes is hidden on the home wireless network 122 (and therefore unknown to the alternate wireless network 121**).

In step 3, the owner of the wireless device 113 provisions the device with the home wireless network 122. Put differently, the wireless device 113, while still not activated, is configured to be used with a specific wireless network (i.e., home wireless network in this example). For example, before activation can occur, an account is set up with the billing system associated with the home wireless network 121. For example, the owner of the wireless device 113 initiates a business arrangement with the carrier of the home wireless network 121.) Accordingly, the owner of the wireless device 113 contacts the home wireless network 121 to set up the account. In one example, only after this step is complete can the provisioning server 141 identify the account in order to activate the wireless device 113. Step 3 may be performed immediately after step two or after a substantial length of time (e.g., months or years).

In step 4, now that a business account relationship exists, Information Technology (IT) personnel set up the provisioning server 141 and provide it with the requisite credentials for the wireless device 113. Note this step does not dictate when the wireless device 113 will request activation. This step ensures that, when such activation is requested, the provisioning server 141 is equipped with the requisite credentials. Thus, an account is created for the wireless device 113. The account may be created by IT personnel. In one example, the account is created automatically by the activation server 139. It should be noted that the wireless device 113 is still not activated. However, the framework has been created to allow the wireless device 113 to be activated even from remote locations where the home wireless network 122 may not be available directly. For example, a foreign network or the network of a competing service provider (represented by the alternate network 121) can be used as a bridge for the limited purpose of activating the wireless device 113 on a home wireless network 122, which is the network of a service provider with whom the user has or intends to have a subscription for the wireless device 113.

In step 5, the owner requests activation of the wireless device 113. In this regard, a user interface (e.g., display) of the wireless device 113 may provide instructions on how to initiate activation. In one example, an "ACTIVATE" button is displayed on the user interface. When pressed, the wireless device 113 sends the predetermined dialing code (e.g., **\*\*##VZW0000) to any wireless network available (i.e., step 6). In one example, the user of the wireless device 113 is instructed (via user interface or separate paper that came with the wireless device 113) to dial the predetermined dialing code for activation. The network that receives the predetermined dialing code (alternate wireless network 121 in this example) need not have a fully compatible wireless network. Rather, it is enough for it to identify the predetermined dialing code to route the data packet the clearing house 137 and to have suitable technology to route those packets. For example, wireless device 113 does not have to belong to the alternate wireless network 121, nor does it need to have all network features of the alternate network. For example, the wireless device 113 does not need to support all available radio technologies. It is enough for the wireless device 113 to use the alternate wireless network 121 at a physical and network level with at least one compatible channel. Put differently, even though the wireless device 113 may include technology that can support radio and/or Wifi technology that is compatible with the alternate wireless network 121, the wireless device 113 still does not need to belong to the alternate wireless network 121. As discussed above, the alternate wireless network 121 may not be able to understand the contents of the code. For example, the knowledge of the alternate wireless network 121 is limited to simply where to route the data packet to (e.g., clearing house 137**).

As discussed above, in one example the wireless device 113 is embedded in a vehicle. In this regard, the initiation for activation of the wireless device 113 may be automatic when the vehicle is ready for an upgrade (e.g., GPS, software, computer control, etc.,) based on a predetermined schedule or if electronic sensors within the vehicle are activated. For example, sensors within the vehicle, such as accelerometers, pressure, oxygen, etc., may sense a fault that should be communicated to the manufacturer to receive the relevant upgrade for the vehicle or the relevant message to display to the driver. In another example, one or more sensors may determine that the vehicle would benefit from data services (e.g., in case of an accident situation to notify its service center), but activation or software upgrades have not yet been performed. For example, in cases where the data equipment (e.g., modem) of a vehicle is already activated, the vehicle may simply open a data connection to the service center. However, if the vehicle's data device is not activated, it may not have immediate access for help in an emergency situation since an account for those data services does not yet exist. In this regard, software within the vehicle could initiate its own activation process. Accordingly, the mobile device embedded in the vehicle is first activated in order to make such communication to the manufacturer possible.

In step 7, the alternate wireless network 121 identifies the code received by the un-activated wireless device 113 (e.g., **\*\*##VZW0000) and creates a limited tunnel between the alternate wireless network 121 and the wireless device 113. Thus, a connection is provided to the alternate wireless network 121 without credential validation. Based on the code, the call (e.g., data packet) is treated as a normal roaming call, even though the call has no approved credentials. However, in one example, functionality is substantially limited to routing the call to a clearing house 137. The alternate wireless network 121 also creates a secure connection with the clearing house 137** (i.e., step 8).

In step 9, the alternate wireless network 121 sends an access request to the clearing house 137. In one CDMA example, the clearing house is Syniverse. In this example, the alternate wireless network 121 sends the access request code (e.g., **\*\*##VZW0000) unaltered to the clearing house 137. The number dialed is a request for a specific service (e.g., activation, firmware, etc.). The number is used to allow the alternate network to map to a given URL at the clearing house 137**.

Continuing the CDMA example, as part of a normal CDMA RADIUS transaction, the clearing house 137 also receives the alternate network SID and NID. For example, other networks may use alternative network identifiers and access methods such as LTE and DIAMETER.

The clearing house now has the required set of credentials to "look up" the service endpoint, specifically, the code (**\*\*##VZW0000), the alternate network SID and alternate network NID. Using these values, the clearing house 137**, uses its own database to retrieve the stored service URL. For example, it could be a home network service provider activation URL, such as https://activate.vzwnet.com.

At this point, the device, having a clear channel through the alternate wireless network 121 and clearing house 137, can send its MID and any other relevant activation information to the provisioning server 141 identified by the URL, allowing the wireless device 113 to receive its activation packets.

The device, now having received its activation packet, stores its activation credentials, resets and joins the network as a normal data connection.

In another example, the alternate wireless network 121 modifies the code of the request to the clearing house 137 by additionally including whatever credentials the wireless device 113 provides. For example, the wireless device 113 may provide the MEID 800959E188129BBC In this regard, the roaming network (e.g., alternate wireless network 121) provides the code **##VZWnnnn@vzw3g.com, where nnnn is the four digit dial sequence from the device.

For example, the device ID (e.g., MEID, IMEI, etc.) is provided by the wireless device 113. However, additional data could also be provided to the extent the receiving element (e.g., home wireless network 122) can interpret it.

By way of example, (assuming that a Remote Authentication Dial In User Service (RADIUS) is used), when a packet is sent by the wireless device 113 (e.g., using 3 G communication technology), only the code and realm (e.g., URL) is included in the data packet. MEID or the like could either be provided inline (in the bearer channel) or as a proprietary vendor-specific attribute (VSA), (e.g., as a proprietary RADIUS VSA assuming RADIUS were used).

Accordingly, the connection request (to activate the wireless device 113) is sent as a normal "roaming" request to the clearing house 137 (e.g., **##VZWnnnn@vzw3g.com). The address of the clearing house 137 is known both to the alternate wireless network 121 and the home wireless network 122. In one example, the clearing house 137 now carries some "special logic" as described below:

First, using the alternate network 121, the clearing house 137 now has a key to a source network. For example, if the carrier is Bob's Cellular, the source network might be the network identifier (NID) for Bob's Cellular. The clearing house key is information that is stored in a database of the clearing house 137. For example, the clearing house key may include the NID of the alternate network, source address of the alternate network, etc. When the clearing house 137 receives the access request code, it uses the clearing house key to determine the source (e.g., the alternate wireless network 121 in this example), and then, the home wireless network 122.

Second, using the realm (vzw3g.com) the clearing house 137 now can identify the destination carrier (e.g., the home wireless network 121). For example, the clearing house 137 evaluates the code received from the wireless device 113, and identifies the source network from which it received the code (e.g., alternate wireless network 121 in this example). Using a database the clearing house 137 looks up the address of the destination URL. For example, the clearing house 137 has a database that it uses to correlate the MDN of the wireless device 113 with the appropriate wireless service provider (e.g., the home wireless network 122). In one example, the table of the database includes the fields "code; Source NID; Destination URL."

Third, using the MDN key, the clearing house 137 now has a "service key" (**##VZWnnnn).

In step 10, the clearing house 137 uses its database to correlate the wireless device 113 with its respective wireless network. In this regard, FIG. 3 illustrates an exemplary database in the form of a look-up table that correlates wireless devices with their respective wireless networks. For example, for Bob's Cellular, if a dialing code of **##VZW001 is received, the clearing house 137 is instructed to route the traffic to the URL http://service2.vzw.com. For example, the PGW 107b anchors a device to the internet 131. Accordingly, wireless device 113 does not get direct Internet 129 access; instead, it has to go through PGW 107b.

In step 11, the clearing house 137 creates an Internet Protocol (IP) tunnel between itself and the home wireless network 122 through the internet 129 for the limited purpose of forwarding the request from the wireless device 113 to its respective home wireless network 122. Thus, information is transported between the two potentially disjointed IP networks that do not have a native routing path to each other, namely the alternate wireless network 121 and the home wireless network 122. The intermediate transport network of the clearing house 137 creates a bridge between the wireless device 113 and the home wireless network 122.

In step 12, data from the wireless device 113 now flows through the wireless network to the home wireless network 122 via the alternate wireless network 121 and the internet 129 for the purpose of submitting an activation request and receiving activation instructions from the activation server 139. Thus, even though the wireless device 113 is not "known" by the alternate wireless network 121, the alternate wireless network 121 is used to activate the wireless device 113. The activation server 139 can now provide data to the wireless device 113, such as a requisite MDN, MIN, and/or other data to facilitate its activation. For example, the activation server 139 compares the content of the received data packet from the wireless device 113a via the alternate network 121 to one or more activation criteria stored in its memory. For example the activation criteria may be that it has been authenticated by the clearing house 139, authenticated by the provisioning server 141, and that this wireless device is authorized to be activated (e.g., manually by IT personnel or automatically through having valid billing information available). Upon determining, based on the comparison, that the content meets the one or more activation criteria, an activation data packet for activation of the non-activated wireless device 113 is sent to the non-activated wireless device through the home wireless network 122 and the alternate wireless network 121.

In one example, the wireless device 113 may have software/code stored in its memory that performs activation over TCP/IP via the IS683-A TCP/IP standard using the secure IP tunnel based on the data received from the activation server 139.

In one example, the mechanisms used for tunnels between parties are also entirely at the discretion of the alternate and home carriers. For example, IPSEC tunnels could be used to and through the clearing house 137, or Layer 2 Tunneling Protocol (L2TP) could be used to support virtual private networks (VPNs) 121/122. For example, L2TP does not provide any encryption or confidentiality by itself; rather, it relies on an encryption protocol that it passes within the tunnel to provide privacy. If the transactions are encrypted at the application level, one could even use non-encrypted connections.

As noted before, activation is not the only service which can be provided over the tunnels and clearing house. Other services such as firmware upgrades could be provided.

In one example, the activation server 139 sends the requisite software/code as part of the activation data to the wireless device 113 for its activation. For example, the activation server 139 determines whether the non-activated wireless device 113a has requisite software for activation. Upon determining that the non-activated wireless device does not have the requisite software for activation, the requisite software for activation of the wireless device 113a is sent over the alternate wireless network through the secure tunnel.

In another example, assume that there is a request for a firmware upgrade from a non-activated wireless device 113.

The activation methods and systems discussed herein can ultimately reach the firmware service over the temporary tunnel. For example, the customer is not charged for the roaming traffic. Instead the firmware service would pay the related roaming charges or would have an agreement in place with the alternate wireless network where a fixed fee is paid on a regular basis.

Prior to activation, the type of services provided on the secure link between the wireless device 113 and the home wireless network 122 discussed above is any service or services that can be carried over a data connection, such as activation of a wireless device 113. In this regard, both the alternate wireless network 121 and the home wireless network 122 are aware (e.g., from the dialing code) that only those services related to the dialing code are allowed. For example, if the dialing code is consistent with one that indicates that a non-activated wireless device 113 is requesting activation with its home wireless network, then the services provided by both the alternate wireless network 121 and the home wireless network 122 are limited to this purpose. Thus, regular phone calls, text messages, access to the internet for media content, etc., are generally not permitted. In one example, an exception is made for emergency calls, where regular voice calls are permitted for the limited purpose of contacting a Public Safety Answering Point (PSAP). In one example, the alternate wireless network 121 and/or the clearing house 137 is compensated for their services via predetermined fee arrangements.

As discussed above, functions relating to providing activation for a wireless device over an alternate wireless network may be implemented on or facilitated by computers or servers connected for data communication via the components of a packet data network, operating as the clearing house 137, activation server 139, and/or provisioning server 141. Although special purpose devices may be used, such devices also may be implemented using one or more hardware platforms intended to represent a general class of data processing device commonly used to run "server" programming so as to implement the network service activation functions discussed above, albeit with an appropriate network connection for data communication.

Figure 5:
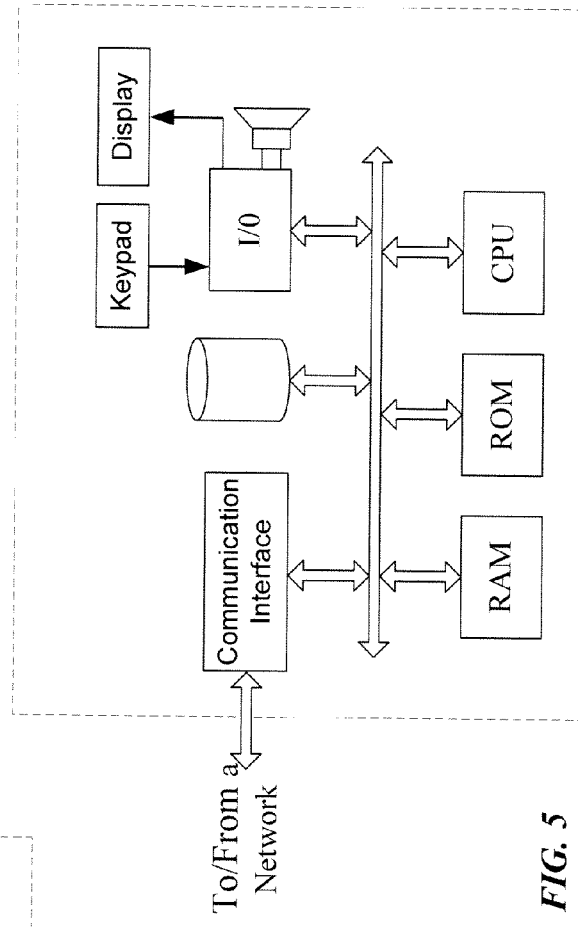
FIG. 5 illustrates a computer with user interface elements.
Figure 4:
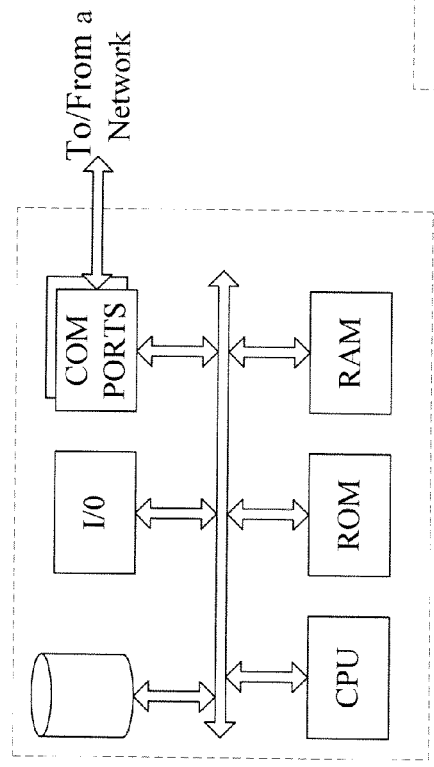
FIG. 4 illustrates a network or host computer.

FIGS. 4 and 5 provide functional block diagram illustrations of general purpose computer hardware platforms. FIG. 4 illustrates a network or host computer platform, as may typically be used to implement a server. FIG. 5 depicts a device with user interface elements, as may be used to implement a personal computer, such as computer 131 of FIG. 1, or a workstation. FIG. 5 can also be used to implement a wireless device, such as a portable handset, a smart-phone, tablet computer, a personal digital assistant or other type of mobile station or mobile terminal device (e.g., devices 113a to 113d of FIG. 1). The device of FIG. 5 may also act as a server if appropriately programmed. It is believed that the general structure and general operation of such equipment as shown in FIGS. 4 and 5 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, one or more such computer hardware platforms would run server programming, for example, to provide a bridge between the alternate wireless network and a home wireless network (e.g., server 137), activation services (e.g., server 139), provisioning services (e.g., server 141), etc., to a wireless device (e.g., 113a to 113d) as illustrated in FIG. 1.

A user terminal such as a general-purpose personal computer or a wireless device typically comprises a central processor or other processing device, an internal communication bus, various types of memory or storage multimedia (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the wireless device to process the instructions received from the network. The software code is executable by the wireless device. In operation, the code is stored within the wireless device. At other times, however, the software may be stored at other locations and/or transported for loading into the appropriate wireless device system. For example, the software may be provided by the activation server 139 over the alternate wireless network. Execution of such code by a processor of the wireless device enables the wireless device to perform functions, including activating the wireless device on the home wireless network, in essentially the manner performed in the implementations discussed and illustrated herein.

Hence, aspects of the methods of service activation as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, self-activation messages, and system components. Although generally known, use of several of these acronyms is not strictly standardized in the art. For the convenience of the reader, the following list correlates terms to acronyms, as used by way of example in the detailed description above.

BS—Base Station
BTS—Base Transceiver System
CAVE—Cellular Authentication and Voice Encryption
CDMA—Code Division Multiple Access
CPU—Central Processing Unit
CRX—Code Division Multiple Access Roaming Exchange
DMU—Dynamic MIP Key Update
EPC—Evolved Packet Core
EPS—Evolved Packet System
EPROM—Erasable Programmable Read Only Memory
EEPROM—Electrically Erasable Programmable Read Only Memory
GPRS—General Packet Radio Service
GRX—General Packet Radio Service Roaming Exchange
GSM—Global System for Mobile Communications
IMEI—International Mobile Equipment Identity
IMSI—International Mobile Subscriber Identity
IP—Internet Protocol
L2TP—Layer 2 Tunneling Protocol
MDN—Mobile Directory Number
MEID—Mobile Equipment Identification Number
MID—Machine Identification Number
MMS—Multimedia Messaging Service
MMSC—Multimedia Messaging Service Center
NID—Network Identifier
PC—Personal Computer
PCO—Protocol Configuration Option
PDA—Personal Digital Assistant
PDN—Packet Data Network
PGW—Packet Data Network Gateway
PROM—Programmable Read Only Memory
PSAP—Public Safety Answering Point
PSTN—Public Switched Telephone Network
QoS—Quality of Service
RAM—Random Access Memory
RAN—Radio Access Network
RADIUS—Remote Authentication Dial In User Service
ROM—Read Only Memory
SID—CDMA System Identifier
SIM—Subscriber Identification Module
SMS—Short Message Service
TCP—Transmission Control Protocol
VPN—Virtual Private Networks
VSA—Vendor Specific Attribute
WAN—Wide Area Network

What is claimed is:

1. A method, comprising steps of:
publishing, to an alternate wireless network, a unique code associated with a non-activated wireless device for obtaining access to an intermediary device;
receiving, from the intermediary device accessed by the non-activated wireless device via the unique code, a data communication including a request for activation of the non-activated wireless device on a home wireless packet communication network, from the non-activated wireless device via the alternate wireless network, on a server configured to provide activation for the non-activated wireless device;
comparing a content of the received data communication to one or more activation criteria; and
upon determining, based on the comparison, that the content meets the one or more activation criteria, sending, by the server through the alternate wireless network to the non-activated wireless device, an activation data packet including credentials for activating the non-activated wireless device on the home wireless network through the alternate wireless network.

2. The method of claim 1, wherein the request is received over a secure IP channel created by the intermediary device between the non-activated wireless device and the home wireless network.

3. The method of claim 1, further comprising limiting functionality of the non-activated wireless device through the alternate wireless network to data communication that enables activation of the non-activated wireless device.

4. The method of claim 1, wherein the activation data packet includes at least one of: a mobile directory number (MDN);
a mobile identification number (MIN);
an activation key; or
software for activation of the non-activated wireless device.

5. The method of claim 1, further comprising sending step by step activation instructions to the non-activated wireless device over the alternate wireless network for presentation to a user on a display of the non-activated wireless device.

6. The method of claim 1, further comprising:
determining whether the non-activated wireless device has requisite software for activation; and upon determining that the non-activated wireless device does not have the requisite software for activation, sending the requisite software for activation over the alternate wireless network.

7. The method of claim 1, further comprising:
receiving a machine identification number (MID);
validating that the non-activated wireless device is not rogue based on the MID; and
confirming that the non-activated wireless device is indeed not activated.

8. A computer system configured as at least one server, the computer system comprising:
a processor;
a network interface coupled to the processor configured to enable communications via a home wireless network and an alternate wireless network;
at least one storage device accessible by the processor for content and programming;
a program stored in the at least one storage device, wherein execution of the program by the processor configures the computer system to perform functions, including functions to:
publish, to the alternate wireless network, a unique code associated with a device for obtaining access to an intermediary device accessed by the non-activated wireless device via the unique code;
receive, from the intermediary device, a data communication including a request for activation of a non-activated wireless device on the home wireless packet communication network from the non-activated wireless device via the alternate wireless network;
compare a content of the received data communication to one or more activation criteria; and
upon determining, based on the comparison, that the content meets the one or more activation criteria, send, by the computer system through the alternate wireless network to the non-activated wireless device, an activation data packet including credentials for activating the non-activated wireless device on the home wireless network through the alternate wireless network.

9. The computer system of claim 8, wherein the request is received over a secure IP channel created by the intermediary device between the non-activated wireless device and the home wireless network.

10. The computer system of claim 8, wherein execution of the program by the processor further configures the computer system to perform the function to:
limit functionality of the non-activated wireless device through the alternate wireless network to data communication that enables activation of the non-activated wireless device.

11. The computer system of claim 8, wherein the activation data packet includes at least one of:
a mobile directory number (MDN);
a mobile identification number (MIN);
an activation key; or
software for activation of the non-activated wireless device.

12. The computer system of claim 8, wherein execution of the program by the processor further configures the computer system to perform the function to send step by step activation instructions for execution by the user to the non-activated wireless device over the alternate wireless network.

13. The computer system of claim 8, wherein execution of the program by the processor further configures the computer system to perform the function to:
determine whether the non-activated wireless device has requisite software for activation;
and
upon determining that the non-activated wireless device does not have the requisite software for activation, send the requisite software for activation over the alternate wireless network.

14. The computer system of claim 8, wherein execution of the program by the processor further configures the computer system to perform the function to:
receive a machine identification number (MID);
validate that the non-activated wireless device is not rogue based on the MID; and confirm
that the non-activated wireless device is indeed not activated.

15. A system comprising:
a non-activated wireless device;
a home wireless network;
a clearing house server;
an alternate wireless network configured to:
route an activation request to the clearing house server upon receiving a predetermined code from the non-activated wireless device, wherein the activation request includes an identifier associated with the alternate wireless network;
wherein the clearing house server is configured to:
authenticate the non-activated wireless device; and
create a secure IP tunnel between the non-activated wireless device and the home wireless network based on the identifier associated with the alternate wireless network;
an activation server configured to:
receive a data communication having the request for activation of the non-activated wireless device from the non-activated wireless device via the alternate wireless network;
compare a content of the received data communication to one or more activation criteria; and
upon determining, based on the comparison, that the content meets the one or more activation criteria, send an activation data packet including credentials for activating the non-activated wireless device on the home wireless network to the non-activated wireless device through the alternate wireless network; and
wherein the non-activated wireless device is configured to:
use the credentials in the activation data packet to activate itself through the alternate wireless network and the secure IP tunnel.

16. The system of claim 15, further comprising a provisioning server configured to:
receive a machine identification number (MID);
validate that the non-activated wireless device is not rogue based on the MID; and
confirm that the non-activated wireless device not activated.

17. The system of claim 15, wherein the clearing house is further configured to receive at least one of the following from the non-activated wireless device over the alternate wireless network:
(i) a Machine Identification Number (MID);
(ii) a Mobile Equipment Identification Number (MEID); or
(iii) an International Mobile Equipment Identity Number (IMEI).

18. The system of claim 15, wherein the alternate wireless network and the home wireless network are configured to limit functionality of the non-activated wireless device through the alternate wireless network to data communication that enables activation of the non-activated wireless device.

19. The system of claim 15, wherein:
the activation server is further configured to send step by step activation instructions for execution by the user to the non-activated wireless device over the alternate wireless; and
the non-activated wireless device is further configured to:
present the step by step activation instruction on a display of the non-activated wireless device.

20. The system of claim 15, wherein the activation server is further configured to:
determine whether the non-activated wireless device has requisite software for activation; and
upon determining that the non-activated wireless device does not have the requisite software for activation, send the requisite software for activation over the alternate wireless network.

* * * * *